United States Patent [19]

Boudinot

[11] 3,791,313

[45] Feb. 12, 1974

[54] WINDBREAKERS ADJUSTABLE MIRROR FOR RAILWAY LOCOMOTIVES

[76] Inventor: Ralph A. Boudinot, 3002 Robinhood Rd., Houston, Tex. 77005

[22] Filed: May 30, 1972

[21] Appl. No.: 257,856

[52] U.S. Cl............ 105/456, 98/28, 105/342, 296/84 C
[51] Int. Cl... B61c 17/00, B61d 49/00, B61k 13/00
[58] Field of Search ...... 98/28; 105/26 R, 456, 342; 296/84 C

[56] References Cited
UNITED STATES PATENTS

| | | | |
|---|---|---|---|
| 1,846,842 | 2/1932 | Butler | 296/84 C X |
| 1,554,222 | 9/1925 | McCauley | 296/84 C |
| 1,633,368 | 6/1927 | Hammond | 296/84 C |
| 1,477,655 | 12/1923 | McCullough | 296/84 C |
| 1,714,135 | 5/1929 | Prime | 98/28 |

Primary Examiner—Gerald M. Forlenza
Assistant Examiner—Howard Beltran
Attorney, Agent, or Firm—Carl B. Fox, Jr.

[57] ABSTRACT

Windbreaker and adjustable mirror apparatus for the cabs of railway locomotives, mountable at the forward side of the cab window on either side of the cab, for preventing wind, dust, rain, and snow from blowing into the cab and from blowing on persons within the cab. The windbreakers have transparent glass at their lower portions, and have mirrors at their upper portions to serve as rearview mirrors. In one form the rearview mirrors are angularly adjustable.

7 Claims, 5 Drawing Figures

PATENTED FEB 12 1974　　3,791,313
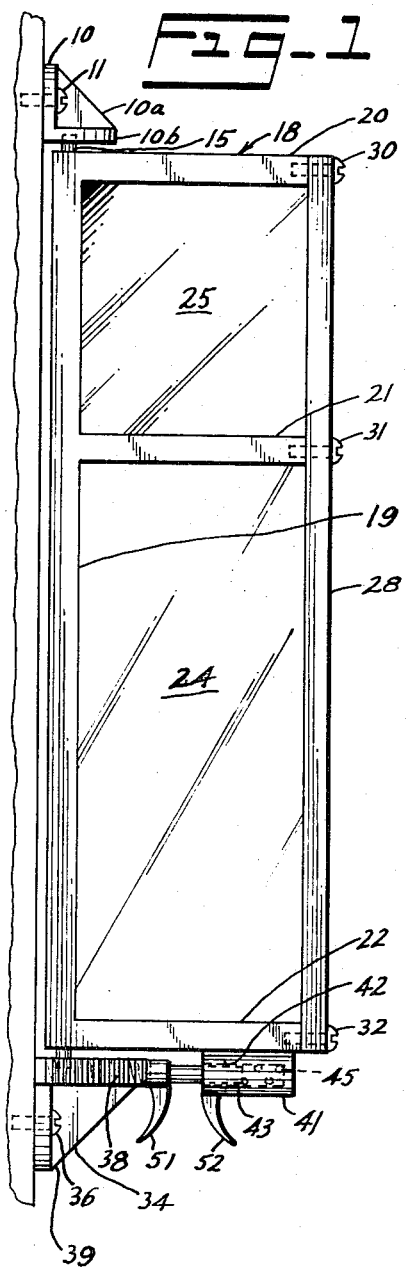
FIG-1
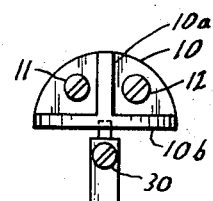
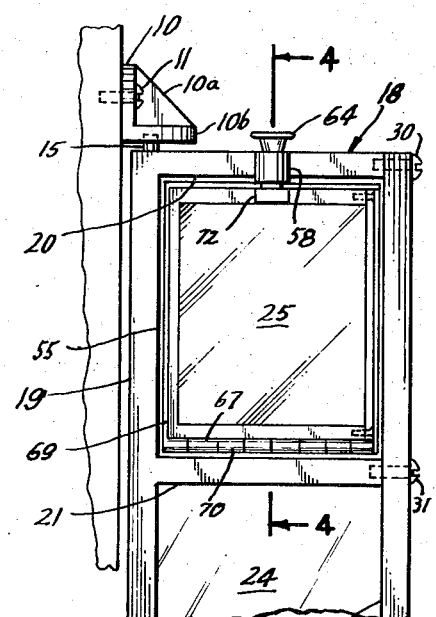
FIG-3
FIG-2
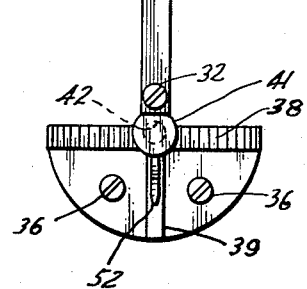
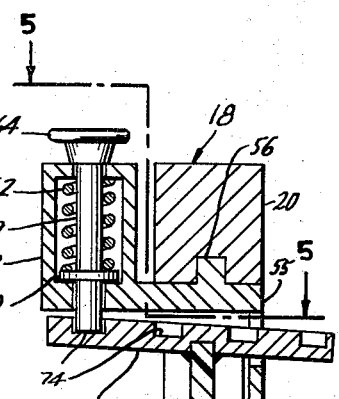
FIG-4
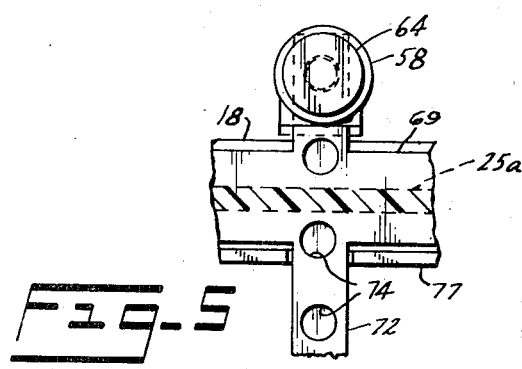
FIG-5
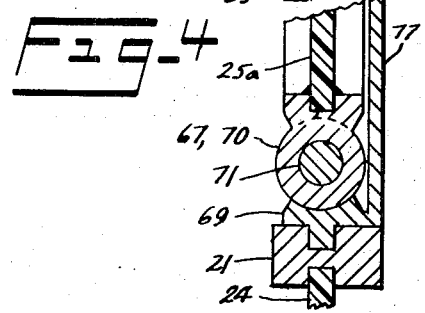

3,791,313

WINDBREAKERS ADJUSTABLE MIRROR FOR RAILWAY LOCOMOTIVES

SUMMARY OF THE INVENTION

Windbreakers for railway locomotive cab windows conventionally have included transparent glass portions, and often are provided with rearview mirrors located at the bottom portions of the windbreakers. While such windbreakers are fairly useful, the positioning of the mirror portions at the lower ends of the windbreakers has resulted in excessive hindrance of vision by the engineer or fireman within the locomotive cab. The positioning of the rearview mirror portions of the windbreakers at the lower ends of the windbreakers has been consistently used, since it has been thought that the location of the mirror below the level of the engineer's or fireman's eyes gives better viewing of the rearward sides of the train, behind the locomotive, since the cab is relatively high off the ground and it has been thought that a downward viewing angle to the mirror and the consequent reflective downward angle along the train would provide better viewing.

However, it has been found that positioning of the rearview mirror at the upper part of the windbreaker gives substantially better results. When a locomotive is approaching a crossing, a congested area, or other place where close, constant, and thorough visibility is required, the bottom positioning of the rearview mirror frequently obstructs such vision. Vision with the mirror so disposed at the lower portion of the windbreaker is not hindered with respect to distant vision, as when the locomotive and train are travelling across open countryside, but in railroad yards and in cities where vision closer to the train becomes more important, the lower positioned rearview mirrors do in fact constitute a definite safety hazard because of the difficulties of viewing relatively close objects and persons.

When windbreakers are constructed with the rearview mirror portion at the top of the windbreaker, in accordance with the invention, no hindrance to long range vision is encountered, and yet at the same time vision of closer objects is very greatly improved. Vision of the closer objects is in a downward direction from the locomotive cab, and since the rearview mirror portion of the visor is elevated, it does not present a hindrance to such vision. The most important viewing directions when a locomotive is operated in a city or town, or in a switching yard, or the like, is angular downward viewing relatively close to the train and immediately along the track, and it is this very field of view that conventional locomotive windbreakers having mirrors at their lower portions have obstructed to a considerable degree.

Frequently, because of the poor visibility therepast, locomotive engineers have pivotally moved the windbreakers to out-of-use positions against the cab in order that viewing will not be impaired, and the windbreakers of the present invention will eliminate the necessity for doing this.

The invention, in addition, provides windbreaker structures which are less subject to damage and which will require less time and expense for maintenance and repairs, as well as replacement. The windbreakers are pivotally movable about a vertical axis to against the cab, the aforementioned out-of-use position, in conventional manner. The windbreakers having angularly adjustable rearview mirrors have novel means for angular adjustment which are reliable and not subject to damage of the mirror or other parts of the structure. An improved assembly for providing pivotal movement about the vertical axis of rotation of the windbreakers is also provided, which is trouble-free and which provides that the engineer or fireman or other operator of the mirror may have complete control of the windbreaker at all times during movements, yet the movements are accomplishable in easier fashion with only one hand.

Other objects and advantages of the invention will appear from the following detailed description of the preferred forms of the apparatus, reference during the descriptions being made to the accompanying drawings.

BRIEF DESCRIPTIONS OF THE DRAWINGS

FIG. 1 is an elevation of a windbreaker of preferred form, having a non-angularly adjustable rearview mirror, according to the invention.

FIG. 2 is a side elevation of the apparatus shown in FIG. 1.

FIG. 3 is a partial elevation of a modified form of apparatus according to the invention.

FIG. 4 is a partial transverse elevation of the visor shown in FIG. 3.

FIG. 5 is an enlarged top or plan view of the apparatus shown in FIGS. 3 and 4.

DESCRIPTION OF THE PREFERRED EMBODIMENTS

Referring first to the preferred form of apparatus shown in FIGS. 1 and 2, a bracket 10 having gusset flange portion 10a and bottom flange portion 10b is adaptable to be connected to the side of a railway locomotive, in front of and adjacent the top of the cab window, by screws 11, 12. A hole at the bottom of bracket 10 receives a pin 15 which is carried at the upper, inner edge of frame 18. Frame 18 has a vertical bar 19 at the side adjacent the locomotive, and has outwardly extending bar portions 20, 21, and 22. The bars 19 – 22 are grooved at their inwardly facing sides to receive pane 24 of transparent glass and pane 25, a mirror. The crossbar 21, of course, is grooved at its upper and lower sides to receive the edges of both panes 24 and 25. A removable bar 28 inwardly grooved or slotted to receive the outer edges of glass pane 24 and mirror 25 is secured to frame 18 by screws 30, 31 and 32. These screws are received through holes through bar 28 and the inner ends of the screws are threaded into tapped openings at the ends of bars 20, 21 and 22, respectively. An elastomeric material may be provided at the edges of the glass and mirror to prevent vibration and possible damage thereto, as is conventional and is not shown in the drawings.

At the lower end of the windbreaker, a bracket 34 is provided below bracket 10, and is connected to the locomotive cab side by screws 36. The upper flange-like portion of bracket 34 is surrounded at its curved edge by side-by-side ribs or teeth 38. A gusset 39 extends between the vertical and horizontal flanges. Bar 22 has at its lower outer end an integral formation 41 having an opening 42 at its inner side into which is disposed a plunger 43. Plunger 43 has an end enlargement 44 against which a compression spring 45 is disposed to bias plunger 43 outwardly. Plunger 43 has a formation 47 which is ribbed at its outer side to interengage with teeth 38 of flange 37. Formation 47 has a downwardly extending finger grip 51, a similar oppositely turned finger grip 52 being integrally formed downwardly from element 41. When finger grips 51, 52 are engaged at their outer sides by fingers of the hand, and squeezed, plunger 43 is forced into opening 42 to disengage formation 47 from teeth 38. When this is done, formation 47 may be pivotally moved along the length of teeth 38 in either direction, to change the angular position of the windbreaker with respect to the side of the cab, and if desired to place the windbreaker flushly against the side of the cab in either direction. Release of the finger grips 51, 52 brings formation 47 back into engagement with teeth 38 so that the windbreaker is fixed in place.

In FIGS. 1 and 2, the mirror 25 is fixed in place and is not angularly adjustable. This form of the apparatus has great utility especially where a minimum of operation of the locomotive under close conditions is contemplated. Movement of the engineer's or fireman's head suitably adjusts the view through the glass 24 and the mirror 25 as occasion demands, so that what is desired to be seen can be seen with clarity.

In the modification of the apparatus shown in FIGS. 3–5, the apparatus provides for angular adjustments of the rearview mirror 25a. Elements shown in FIGS. 3–5 which are the same as elements of FIGS. 1–2 are indicated by the reference numerals of FIGS. 1 and 2 and will not be redescribed. In the windbreakers of FIGS. 3–5 a rectangular frame 55 is inserted into the mirror grooves of bars 19, 20, and 21 of frame 18. Frame 55 has an outer surrounding flange or bead 56 which fits into the mirror groove of frame 18. At its upper side, frame 55 has a projecting formation 58 through which is vertically disposed a shaft 59. Shaft 59 has an enlargement 60 above which is disposed compression spring 62. At its upper end shaft 59 has handle 64.

At its lower side, frame 55 has a hinge formation 67. Frame 69, which surrounds rearview mirror 25a, has a lower hinge formation 70. A pin 71 pivotally interengages hinge formations 67, 70, so that frame 69 is pivotally movable.

At its upper side, frame 69 has a curved transversely disposed integral bar formation 72 in the upper side of which are series of spaced holes 74. Shaft 59 is interchangeably engageable in each of the holes 74. When shaft 59 is pulled up against the compression bias of spring 62 and the mirror is moved to place the shaft in a different hole 74, the angular position of mirror 25 is altered.

In order that wind and dust will not penetrate past the mirror 25a and its frame 69, a plate 77 is provided behind the mirror and frame. Plate 77 may be integral with frame 55, as shown, or may be screwed thereonto at the back side of frame 55, and has an opening for passage of bar 72.

As will be understood, the apparatus is of durable construction and readily adapted to the service required. The frames 55, 69 of FIGS. 3–5 may be placed in the upper opening of frame 18 of FIGS. 1 and 2, so that in case the apparatus of FIGS. 1 and 2 is originally installed, the apparatus may easily be converted to the form of FIGS. 3–5, and vise versa. The position adjustment of the windbreaker, or visor, at the side of the locomotive cab, i.e. the adjustment provided by squeezing together finger grips 51, 52 and moving the angular position of the mirror at teeth 38, is easily accomplished even while the locomotive is moving, since only one hand is required to make the change in the windbreaker position. The mirror angle adjustment of shaft 59 in holes 74 of bar 72 is also accomplishable by one and operation. The handle 64 may be elevated by the thumb and one or more adjacent fingers, while the heel of the hand placed beneath bar 72 adjusts the angular position of the mirror and frame. Therefore, a completely adjustable, serviceable, apparatus is provided which is superior to conventional apparatus. The location of the mirror at the upper portion of the windbreaker relieves the engineer or fireman of field of view obstruction for operation of the locomotive in places such as cities and towns and railway yards where visibility adjacent to the train is desirable.

While preferred embodiments of the invention have been described and shown in the drawings, many modifications thereof may be made by a person skilled in the art without departing from the spirit of the invention, and it is intended to protect by Letters Patent all forms of the invention falling within the scope of the following claims.

I claim:

1. Windbreaker for railway locomotives, and the like, comprising vertically elongate generally rectangular frame means, connection means for connecting one vertical side of said frame means to the side of the cab of a locomotive, an intermediate bar disposed horizontally across said frame means to devide said frame into upper and lower portions, said frame means having mirror means within said upper portion and transparent pane means within said lower portion whereby said lower portion of the windbreaker affords unimpaired observation therepast, said frame means and intermediate bar having continuous slot means around said upper portion, a stationary outer mirror frame received within said slot means, a pivotal inner mirror frame surrounding said mirror means and hinged to said outer mirror frame at its lower side, mutually engageable latch elements at the upper sides of said outer and inner mirror frames providing multiple angular positions of said inner mirror frame and mirror means with respect to said outer mirror frame and said frame means.

2. The combination of claim 1, said connection means being pivotal and adapted to permit adjustment of the angular position of said frame means about a vertical axis.

3. The combination of claim 2, said pivotal connection means comprising first and second bracket means connectable to the side of said locomotive cab respectively above and below said frame means, vertical pin means engaged between each said bracket means and said frame means and said frame means being pivotally movable about said pin means, said second bracket means having semicircularly disposed teeth concentric with said pin means, engagement means carried by said frame means releasably engaged with said teeth to adjustably fix the angular position of said frame means.

4. The combination of claim 3, said engagement means comprising cylinder body means affixed to the lower side of said frame means, plunger means spring biased from an end of said cylinder body means toward said teeth of said second bracket means, and finger grip means on each of said plunger means and said cylinder body means adapted to be simultaneously held by the hand and squeezed to disengage said plunger means from said teeth to move said frame means to a different angular position.

5. The combination of claim 1, said frame means and intermediate bar means having continuous slot means around said lower portion and said transparent pane means having its edges engaged therein, one vertical side of said frame means being removable whereby said transparent pane means and said outer mirror frame is removable from said frame means.

6. The combination of claim 1, said mutually engageable latch elements comprising retractable shaft means on the upper side of said outer mirror frame and arcuate bar means having spaced openings therealong disposed transverse to the upper side of said inner mirror frame, said retractable shaft means being engageable into any of said spaced openings of said arcuate bar means to adjust the angular position of said mirror means.

7. The combination of claim 6, said outer mirror frame having plate means thereacross behind said inner mirror frame and mirror means, said plate means having an opening therethrough through which said arcuate bar means extends.

* * * * *